US011650452B2

(12) United States Patent
Son et al.

(10) Patent No.: US 11,650,452 B2
(45) Date of Patent: May 16, 2023

(54) DISPLAY DEVICE COMPRISING AN OPTICAL LAYER HAVING A PLURALITY OF OPENINGS AND AN AIR LAYER DISPERSED AMONG A PLURALITY OF OPTICAL FIBER SEGMENTS

(71) Applicant: Samsung Display Co., Ltd., Yongin-Si (KR)

(72) Inventors: Juyoun Son, Cheonan-si (KR); Dohun Kim, Suwon-si (KR); Jieun Nam, Seoul (KR); Jae Sul An, Hwaseong-si (KR); Kise Lee, Yongin-si (KR); Young-keun Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 264 days.

(21) Appl. No.: 16/905,803

(22) Filed: Jun. 18, 2020

(65) Prior Publication Data
US 2021/0080781 A1    Mar. 18, 2021

(30) Foreign Application Priority Data
Sep. 17, 2019  (KR) .................... 10-2019-0114104

(51) Int. Cl.
*G02F 1/1335* (2006.01)

(52) U.S. Cl.
CPC .. *G02F 1/133524* (2013.01); *G02F 1/133502* (2013.01); *G02F 1/133504* (2013.01); *G02F 1/133528* (2013.01); *G02F 2202/28* (2013.01)

(58) Field of Classification Search
CPC ................ G02F 1/133562; G02F 2201/02
See application file for complete search history.

(56) References Cited

U.S. PATENT DOCUMENTS

| 10,048,409 B2 | 8/2018 | Lee et al. | |
| 2007/0279367 A1* | 12/2007 | Kitai | G02F 1/13336 345/102 |
| 2009/0092366 A1* | 4/2009 | Iwasaki | G02B 6/10 385/129 |
| 2012/0155800 A1* | 6/2012 | Cottrell | G02B 6/04 385/116 |
| 2016/0033703 A1* | 2/2016 | Kim | G02B 6/0006 362/558 |
| 2017/0192303 A1* | 7/2017 | Kang | G02F 1/133606 |

FOREIGN PATENT DOCUMENTS

| CN | 207730662 U | * | 8/2018 |
| JP | 2001265265 A | * | 9/2001 |
| KR | 10-1040932 B1 | | 6/2011 |
| KR | 10-2015-0016993 A | | 2/2015 |
| KR | 10-2019-0024664 A | | 3/2019 |

\* cited by examiner

*Primary Examiner* — Paul C Lee
(74) *Attorney, Agent, or Firm* — Innovation Counsel LLP (57) ABSTRACT

Disclosed are display devices and methods of fabricating the same. The display device comprises a display panel, an optical layer on the display panel, and a backlight unit that is below the display panel and provides the display panel with light. The optical layer includes a plurality of optical fiber segments, and an air layer between the optical fiber segments. The light generated from the backlight unit is provided to the optical fiber segments through the display panel, and the light is diffused by the optical fiber segments and an air layer dispersed among the optical fiber segments.

11 Claims, 8 Drawing Sheets

DISPLAY DEVICE COMPRISING AN OPTICAL LAYER HAVING A PLURALITY OF OPENINGS AND AN AIR LAYER DISPERSED AMONG A PLURALITY OF OPTICAL FIBER SEGMENTS

CROSS-REFERENCE TO RELATED APPLICATION

This U.S. nonprovisional application claims priority under 35 U.S.C. § 119 to Korean Patent Application No. 10-2019-0114104 filed on Sep. 17, 2019, in the Korean Intellectual Property Office, the disclosures of which are hereby incorporated by reference in their entirety.

BACKGROUND

1. Field

The present disclosure relates to a display device and a method of fabricating the same. More particularly, the present disclosure provides a display device capable of improving side visibility and a method of fabricating the same.

2. Description of the Related Art

In general, a display device may include a display panel that uses light to display an image and a backlight unit that generates light and provides the display panel with the light. The display panel may include a first substrate on which a plurality of pixels are disposed, a second substrate that faces the first substrate, and an image display layer disposed between the first substrate and the second substrate.

The pixels may drive the image display layer, and an image may be displayed on the image display layer that adjusts transmittance of light provided from the backlight unit to the display panel. The image display layer may include a liquid crystal layer, an electro-wetting layer, or an electrophoresis layer.

As an user is provided with light emitted from an upper portion of the display panel, the user recognizes an image. However, when the image is provided to the user, the image quality is not sufficiently satisfactory due to side visibility. Thus, a novel method to improve side visibility of the display device is needed.

SUMMARY

Some example embodiments of the present disclosure provide a display device capable of improving side visibility and a method of fabricating the same.

According to some example embodiments of the present disclosure, a display device may comprise a display panel, an optical layer on the display panel, and a backlight unit that is below the display panel and provides the display panel with light. The optical layer may include a plurality of optical fiber segments and an air layer dispersed among the optical fiber segments.

In some embodiments, the display device may further comprise a resin that is disposed inside of the air layer and has a refractive index less than a refractive index of the optical fiber segments.

In some embodiments, the optical fiber segments may be in partial contact with each other. One or more of the optical fiber segments may be spaced apart from other optical fiber segments.

In some embodiments, the optical fiber segments may include polyethylene terephthalate, polycarbonate, polystyrene, or poly methyl methacrylate.

In some embodiments, the optical layer may have a thickness of about 20 µm to about 150 µm.

In some embodiments, the light is passed through the display and provided to the optical layer. The optical layer may be defined with a plurality of openings that allow light to pass through.

In some embodiments, the display panel may have a plane defined by a first direction and a second direction that intersects the first direction. The openings may be arranged in a first diagonal direction and a second diagonal direction that intersects the first diagonal direction. The first diagonal direction may intersect the first and second directions on the plane.

In some embodiments, the display device may further comprise a first polarizing plate disposed between the display panel and the backlight unit, and a second polarizing plate disposed between the display panel and the optical layer.

In some embodiments, the display device may further comprise an antireflective layer on the optical layer.

In some embodiments, the display device may further comprise a first adhesive disposed between the optical layer and the second polarizing plate and a second adhesive disposed between the optical layer and the antireflective layer.

According to some example embodiments of the present disclosure, a display device may comprise a display pane, a polarizing plate on the display panel, a plurality of optical fiber segments on the polarizing plate, and a backlight unit below the display panel. Light generated from the backlight unit may be provided to the optical fiber segments through the display panel and the polarizing plate, and may be diffused by the optical fiber segments and an air layer between the optical fiber segments.

According to some example embodiments of the present disclosure, a method of fabricating a display device may comprise preparing a support plate which has a mesh shape and on which a plurality of protrusions are disposed, providing on the support plate a solution having a plurality of optical fiber segments to remove the solution through a plurality of openings defined based on the mesh shape of the support plate and to place the optical fiber segments on the support plate, supplying the optical fiber segments with pressure and heat to make the optical fiber segments connected to each other to form an optical layer, and placing the optical layer on a display panel.

In some embodiments, the method may further comprise, before placing the optical layer on the display panel, applying an adhesive layer between the display panel and the optical layer to attach the optical layer to the display panel.

In some embodiments, the optical fiber segments may be disposed around each of the protrusions.

In some embodiments, the optical layer on the display panel may be defined with a plurality of openings. The openings of the optical layer may correspond to positions where the protrusions are disposed.

In some embodiments, each of the optical fiber segments may have a length greater than a width of each of the openings.

In some embodiments, the optical fiber segments may include polyethylene terephthalate, polycarbonate, polystyrene, or poly methyl methacrylate.

In some embodiments, the optical layer may have a thickness of about 20 µm to about 150 µm.

In some embodiments, a resin disposed inside of an air layer which is dispersed among the optical fiber segments. The air layer may have a refractive index less than a refractive index of the optical fiber segments. The optical fiber segments may be in partial contact with each other. One or more of the optical fiber segments may be spaced apart from other optical fiber segments.

DETAILED DESCRIPTION OF EMBODIMENTS

In this description, when a certain component (or region, layer, portion, etc.) is referred to as being "on", "connected to", or "coupled to" other component(s), the certain component may be directly disposed on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents.

The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

The following will now describe in detail some example embodiments of the present disclosure in conjunction with the accompanying drawings.

Figure 1:
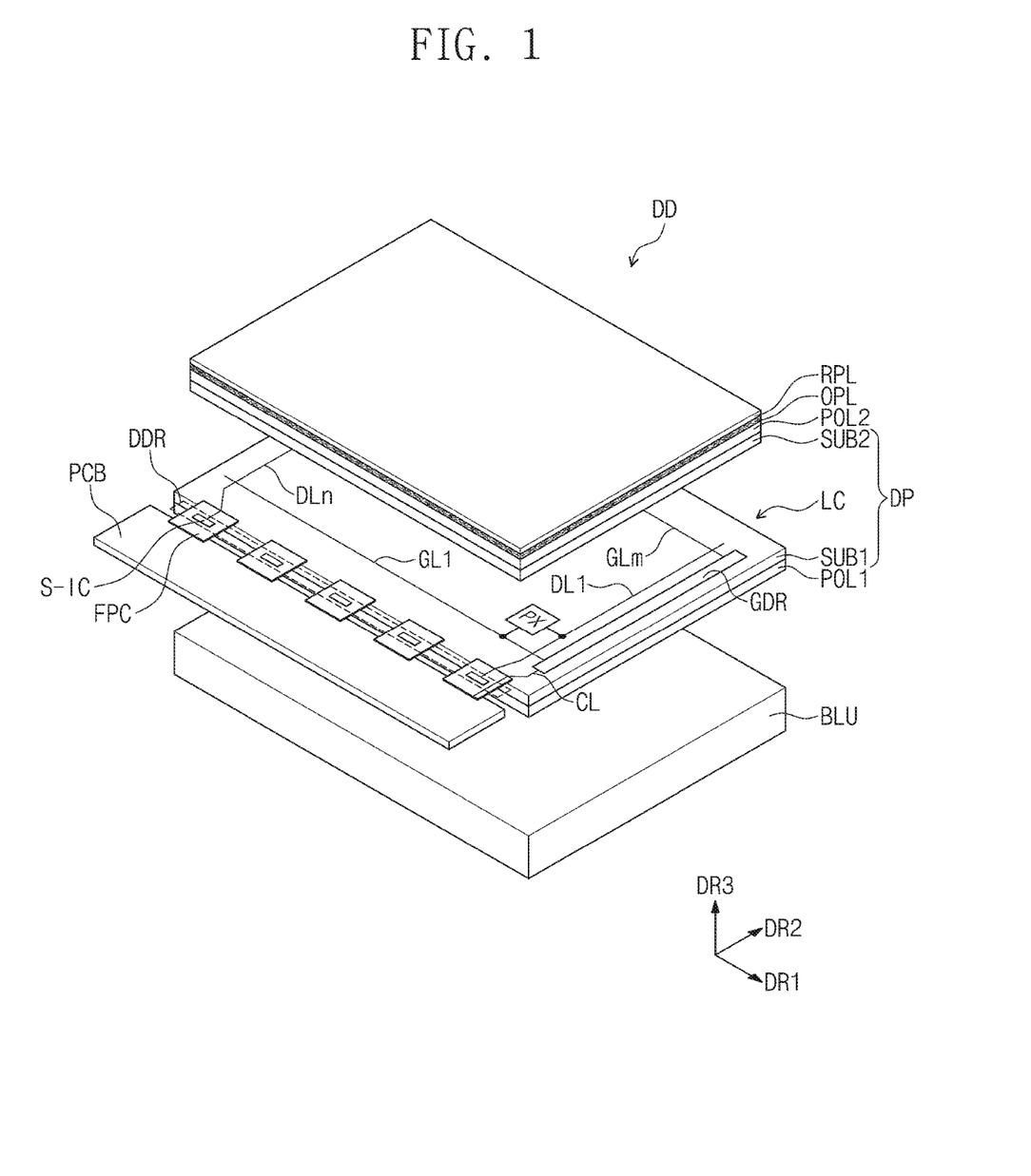
FIG. 1 illustrates a perspective view showing a display device according to some example embodiments of the present disclosure.

FIG. 1 illustrates a perspective view showing a display device according to some example embodiments of the present disclosure.

Referring to FIG. 1, a display device DD according to some embodiments of the present disclosure may include a display panel DP, a gate driver GDR, a printed circuit board PCB, a data driver DDR, an optical layer OPL, an antireflective layer RPL, first and second polarizing plates POL1 and POL2, and a backlight unit BLU.

The display panel DP, the optical layer OPL, the antireflective layer RPL, and the backlight unit BLU may each have a rectangular shape that has long sides in a first direction DR1 and short sides in a second direction DR2 perpendicularly intersecting the first direction DR1. A third direction DR3 is defined herein to refer to a direction that is substantially perpendicular to a plane defined by the first and second directions DR1 and DR2. In this description, the phrase "when viewed from a top plan" may mean that "when viewed in the third direction DR3."

The display panel DP may include a first substrate SUB1, a second substrate SUB2 facing the first substrate SUB1, and a liquid crystal layer LC between the first substrate SUB1 and the second substrate SUB2. The first and second substrates SUB1 and SUB2 may each have a rectangular shape that has long sides in the first direction DR1 and short sides in the second direction DR2. The first and second substrates SUB1 and SUB2 may be transparent dielectric substrates, which may include plastic or glass.

FIG. 1 shows a liquid crystal display panel, including the liquid crystal layer LC, as the display panel DP. The present disclosure, however, are not limited. For example, an electrophoresis display panel, an electro-wetting display panel, an organic light emitting display panel, or any other various display panels may be used as the display panel DP.

The first substrate SUB1 may be provided with a plurality of pixels PX, a plurality of gate lines GL1 to GLm, and a plurality of data lines DL1 to DLn. The subscripts "m" and "n" are natural numbers. For convenience of description, FIG. 1 shows a single pixel PX, but substantially, a plurality of pixels PX may be disposed on the first substrate SUB1.

The gate lines GL1 to GLm may be insulated from and may intersect the data lines DL1 to DLm. The gate lines GL1 to GLm may extend in the first direction DR1 to come into connection with the gate driver GDR. The data lines DL1 to DLn may extend in the second direction DR2 to come into connection with the data driver DDR.

The pixels PX may be connected to the gate lines GL1 to GLm and the data lines DL1 to DLn. The pixels PX may be arranged in a matrix form, but the arrangement of the pixels PX is not limited. Each pixel PX may display one of primary colors. The primary colors may include red, green, and blue colors. The present disclosure, however, are not limited. For example, the primary colors may further include various colors, such as white, yellow, cyan, and magenta.

The gate driver GDR may be disposed on a portion of the first substrate SUB1, which portion is adjacent to one of the short sides of the first substrate SUB1. The first substrate SUB1 may be mounted with the gate driver GDR which is formed in the same process used for forming transistors of the pixels PX and may be formed of an amorphous silicon TFT gate driver circuit (ASG) or an oxide silicon TFT gate driver circuit (OSG).

In other embodiments, the gate driver GDR may be formed of a plurality of driver chips mounted on flexible circuit boards, and a tape carrier package (TCP) manner is employed to connect the gate driver GDR to the first substrate SUB1. Alternatively, a chip-on-glass (COG) scheme may be used to mount the driver chips of the gate driver GDR on the first substrate SUB1.

The data driver DDR may be connected through flexible circuit boards FPC to the display panel DP. For example, a tape carrier package (TCP) manner may be used to connect the data driver DDR to the display panel DP. For another example, a chip-on-glass (COG) scheme may be used to mount the data driver DDR on the first substrate SUB1.

The data driver DDR may include a plurality of source driver chips S-IC mounted on the flexible circuit boards FPC. For example, FIG. 1 illustrates five source driver chips S-IC and five flexible circuit boards FPC, but the numbers of the source driver chips S-IC and the flexible circuit boards FPC may be changed depending on size of the display panel DP.

One side of each flexible circuit board FPC may be connected to one side of the first substrate SUB1. The one side of the first substrate SUB1 may be defined to indicate one of the long sides of the first substrate SUB1. Other side of each flexible circuit board FPC may be connected to the printed circuit board PCB. The source driver chips S-IC may be connected to the first substrate SUB1 and the printed circuit board PCB through the flexible circuit boards FPC.

A timing controller (not shown) may be disposed on the printed circuit board PCB. The printed circuit board PCB may be mounted with the timing controller as the form of an integrated circuit chip. The timing controller may be connected to the gate driver GDR and the data driver DDR through the flexible circuit boards FPC. The timing controller may output a gate control signal, a data control signal, and image data.

The gate driver GDR may receive the gate control signal from the timing controller. The gate control signal may be provided to the gate driver GDR through a control line CL. In response to the gate control signal, the gate driver GDR may generate a plurality of gate signals. The gate driver GDR may sequentially output the gate signals. The gate signals may be provided through the gate lines GL1 to GLm to the pixels PX.

The data driver DDR may receive image data and a data control signal from the timing controller. In response to the data control signal, the data driver DDR may generate analog data voltages corresponding to the image data, and output the data voltages to the data lines DL1 to DLn. The data voltages may be provided through the data lines DL1 to DLn to the pixels PX.

In response to the gate signals provided through the gate lines GL1 to GLm, the pixels PX may be provided with the data voltages through the data lines DL1 to DLn. The pixels PX may display gray scales that correspond to the data voltages, thereby displaying an image.

The backlight unit BLU may be disposed below the display panel DP. The backlight unit BLU may generate light and provide the display panel DP with the generated light. The light provided from the backlight unit BLU may be used by the display panel DP to generate an image and to emit light for providing an image. The backlight unit BLU may be an edge type backlight unit or a direct type backlight unit.

The optical layer OPL may be disposed on the display panel DP. The optical layer OPL may be provided with the light emitted from the display panel DP, and may diffuse and emit the light provided from the display panel DP. The configuration of the optical layer OPL will further be discussed in detail.

As depicted in FIG. 1, the first polarizing plate POL1 may be disposed between the display panel DP and the backlight unit BLU. The second polarizing plate POL2 may be disposed between the display panel DP and the optical layer OPL. The first polarizing plate POL1 may be disposed below the first substrate SUB1, and the second polarizing plate POL2 may be disposed above the second substrate SUB2.

The first polarizing plate POL1 may be attached to the first substrate SUB1, and the second polarizing plate POL2 may be attached to the second substrate SUB2. The optical layer OPL may be attached to the second polarizing plate POL2.

The first polarizing plate POL1 may polarize light generated from the backlight unit BLU, and the light may pass through the first substrate SUB1 and then may be provided to the liquid crystal layer LC. When the pixels PX operate, the liquid crystal layer LC may adjust transmittance of the light. The light may pass through the second substrate SUB2 and the second polarizing plate POL2, and then may be provided to an user. The optical layer OPL may diffuse the light that passes through the second polarizing plate POL2, thereby emitting the light. A polarizing axis of the first polarizing plate POL1 may intersect a polarizing axis of the second polarizing plate POL2.

The antireflective layer RPL may be disposed on the optical layer OPL. The optical layer OPL may be attached to a lower portion of the antireflective layer RPL. The antireflective layer RPL may reduce reflectance of light that is externally incident on an upper portion of the display panel DP. To reduce reflectance of light, the antireflective layer RPL may include a retarder and a polarizer.

When a user is provided with reflected external light, the user may recognize both an image generated from the display panel DP and the reflected external light. Because the antireflective layer RPL reduces reflectance of the external light, the user may normally recognize the image generated from the display panel DP.

Figure 2:
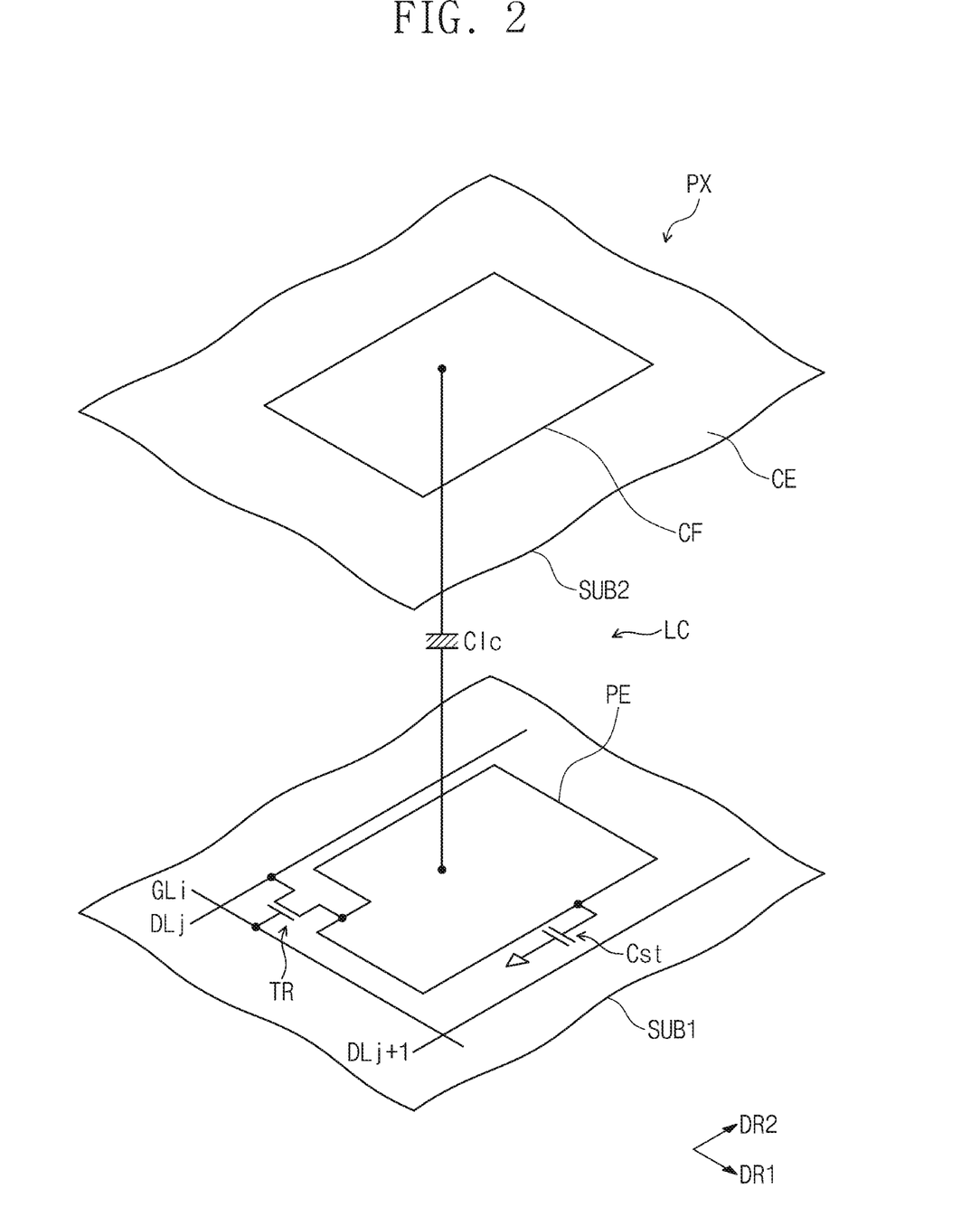
FIG. 2 illustrates a schematic diagram showing the structural configuration of a pixel depicted in FIG. 1.

FIG. 2 shows the configuration of the pixel as shown in FIG. 1.

For convenience of description, FIG. 2 illustrates the pixel PX connected to a gate line GLi and a data line DLj. Although not shown, configurations of other pixels PX of the display panel DP may be equal to that of the pixel PX illustrated in FIG. 2.

Referring to FIG. 2, the pixel PX may include a transistor TR connected to the gate line GLi and the data line DLj, a liquid crystal capacitor Clc connected to the transistor TR, and a storage capacitor Cst connected in parallel to the liquid crystal capacitor Clc. The storage capacitor Cst may be omitted. The subscripts "i" and "j" are natural numbers.

The transistor TR may be disposed on the first substrate SUB1. The transistor TR may include a gate electrode connected to the gate line GLi, a source electrode connected to the data line DLj, and a drain electrode connected to the liquid crystal capacitor Clc and the storage capacitor Cst.

The liquid crystal capacitor Clc may include a pixel electrode PE disposed on the first substrate SUB1, a common electrode CE disposed on the second substrate SUB2, and the liquid crystal layer LC disposed between the pixel electrode PE and the common electrode CE. The liquid crystal layer LC may serve as a dielectric layer. The pixel electrode PE may be connected to the drain electrode of the transistor TR.

The pixel electrode PE may have a non-slit structure as shown in FIG. 2, but alternatively the pixel electrode PE may have a slit structure that includes a cross-shaped stem and a plurality of branches that radially extend from the stem.

The common electrode CE may be disposed on the second substrate SUB2. Alternatively, the common electrode CE may be disposed on the first substrate SUB1. In this case, one or more of the pixel electrode PE and the common electrode CE may include a slit structure.

The storage capacitor Cst may include the pixel electrode PE, a storage electrode (not shown) branched from a storage line (not shown), and a dielectric layer disposed between the pixel electrode PE and the storage electrode. The storage line may be disposed on the first substrate SUB1, and the storage line and the gate line GLi may be formed simultaneously with each other on the same layer. The storage electrode may partially overlap the pixel electrode PE.

The pixel PX may further include a color filter CF that produces one of red, green, and blue colors. In some embodiments, as shown in FIG. 2, the color filter CF may be disposed on the second substrate SUB2. In other embodiments, the color filter CF may be disposed on the first substrate SUB1.

The transistor TR may be turned on in response to the gate signal provided through the gate line GLi. The data voltage received through the data line DLj may be provided through the turned-on transistor TR to the pixel electrode PE of the liquid crystal capacitor Clc. The common electrode CE may be supplied with a common voltage.

A difference in voltage level between the data voltage and the common voltage may produce an electric field between the pixel electrode PE and the common electrode CE. The electric field produced between the pixel electrode PE and the common electrode CE may drive liquid crystal molecules of the liquid crystal layer LC. The liquid crystal molecules driven by the electric field may adjust optical transmittance, thereby displaying an image.

The storage line may be supplied with a storage voltage whose voltage level is uniform. Alternatively, the storage line may be supplied with a common voltage. The storage capacitor Cst may serve to sustain a charge amount of the liquid crystal capacitor Clc.

Figure 3:
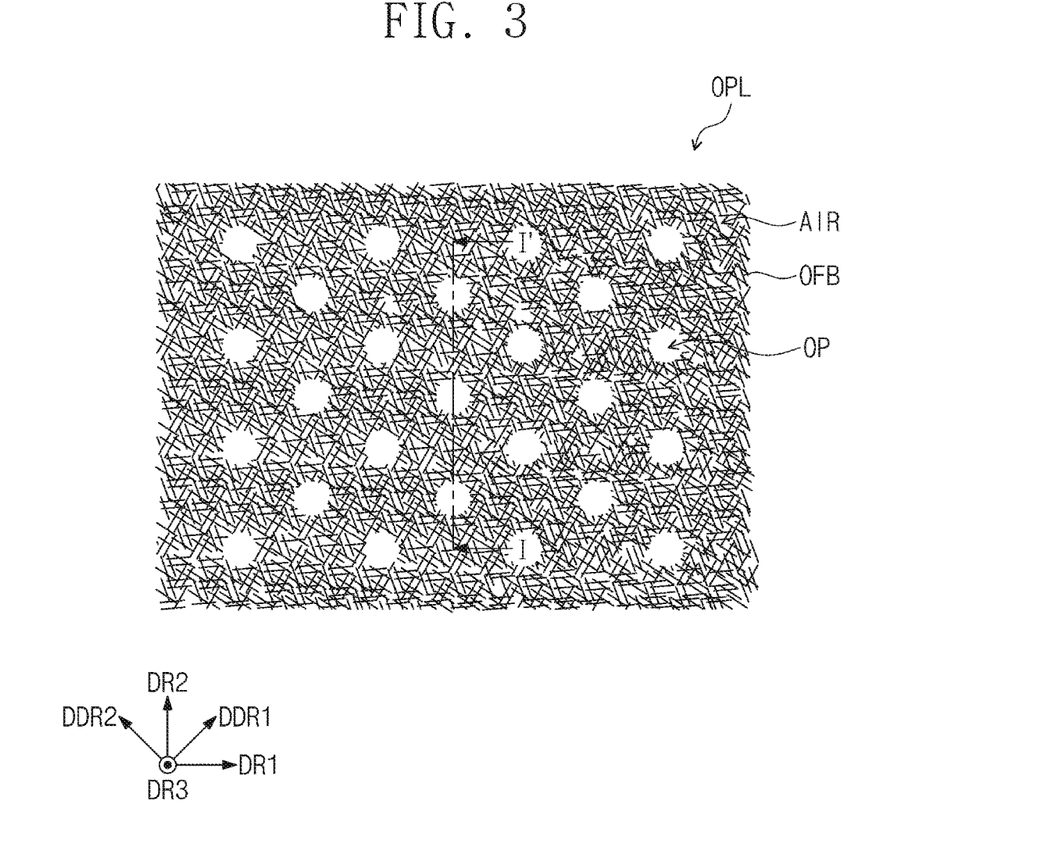
FIG. 3 illustrates a top plan view showing an optical layer shown in FIG. 1.
Figure 4:
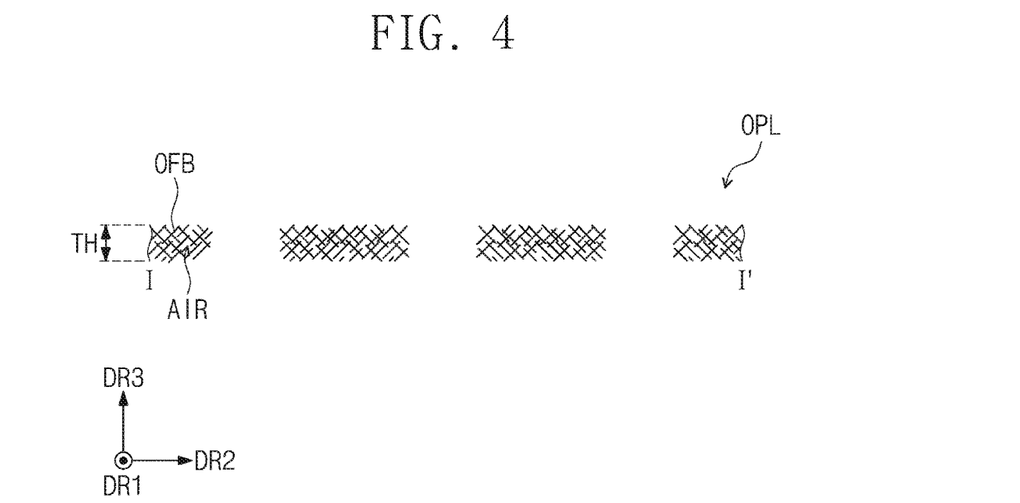
FIG. 4 illustrates a cross-sectional view taken along line I-I' of FIG. 3.

FIG. 3 illustrates a top plan view showing the optical layer shown in FIG. 1. FIG. 4 illustrates a cross-sectional view taken along line I-I' shown in FIG. 3.

FIG. 4 shows a cross-sectional view in the first direction DR1. When viewed in the first direction DR1, optical fiber segments OFB may be seen around openings OP. FIG. 4, however, is a diagram to explain shapes of the openings OP, and for convenience of description, FIG. 4 illustrates only the openings OP or empty spaces. For example, for convenience of description, omission is made about the optical fiber segments OFB that can be seen through the openings OP when viewed in the first direction DR1.

Referring to FIG. 3, the optical layer OPL may include a plurality of optical fiber segments OFB and an air layer AIR between the optical fiber segments OFB. The optical fiber segments OFB may include fiber pieces that are formed by cutting fiber-shaped structures. The fabrication of the optical fiber segments OFB will further be discussed in detail below.

The optical fiber segments OFB may be irregularly arranged. The optical fiber segments OFB may be connected in contact with each other. The optical fiber segments OFB may be in partial contact with each other. Each of the optical fiber segments OFB may extend in a certain direction. Each of the optical fiber segments OFB may extend in an arbitrary direction.

The air layer AIR may be disposed between the optical fiber segments OFB. The optical fiber segments OFB may have their refractive index greater than that of the air layer AIR. Alternatively, the air layer AIR between the optical fiber segments OFB may include therein a resin whose refractive index is less than that of the optical fiber segments OFB. In this case, one or more of the optical fiber segments OFB may not contact other optical fiber segments OFB.

The optical fiber segments OFB may include polyethylene terephthalate (PET), polycarbonate (PC), polystyrene (PS), or poly methyl methacrylate (PMMA).

A plurality of openings OP may be defined on the optical layer OPL. The openings OP may be defined to refer to portions of the optical layer OPL that have no optical fiber segments OFB. The optical fiber segments OFB may be disposed to surround the openings OP. For example, the openings OP may each have a circular shape when viewed from a top, but the shapes of the openings OP are not limited. For example, the shape of the opening OP may be a triangular shape or a rectangular shape. In other examples, the shape of the opening OP may be a polygonal shape.

The openings OP may be arranged in a first diagonal direction DDR1 and a second diagonal direction DDR2 that intersects the first diagonal direction DDR1. On a plane defined by the first and second directions DR1 and DR2, the first diagonal direction DDR1 may be defined to indicate a direction that intersects the first and second directions DR1 and DR2. On a plane defined by the first and second directions DR1 and DR2, the second diagonal direction DDR2 may intersect the first diagonal direction DDR1.

Referring to FIG. 4, the optical layer OPL may have a thickness TH of about 20 μm to about 150 μm. The thickness TH of the optical layer OPL may denote a value measured in the third direction DR3. Substantially, the optical layer OPL may be constituted by the optical fiber segments OFB that are stacked to a height of about 20 μm to about 150 μm. The openings OP may each be defined in the form of a shape that extends in the third direction DR3 to penetrate the optical layer OPL.

Figure 5:
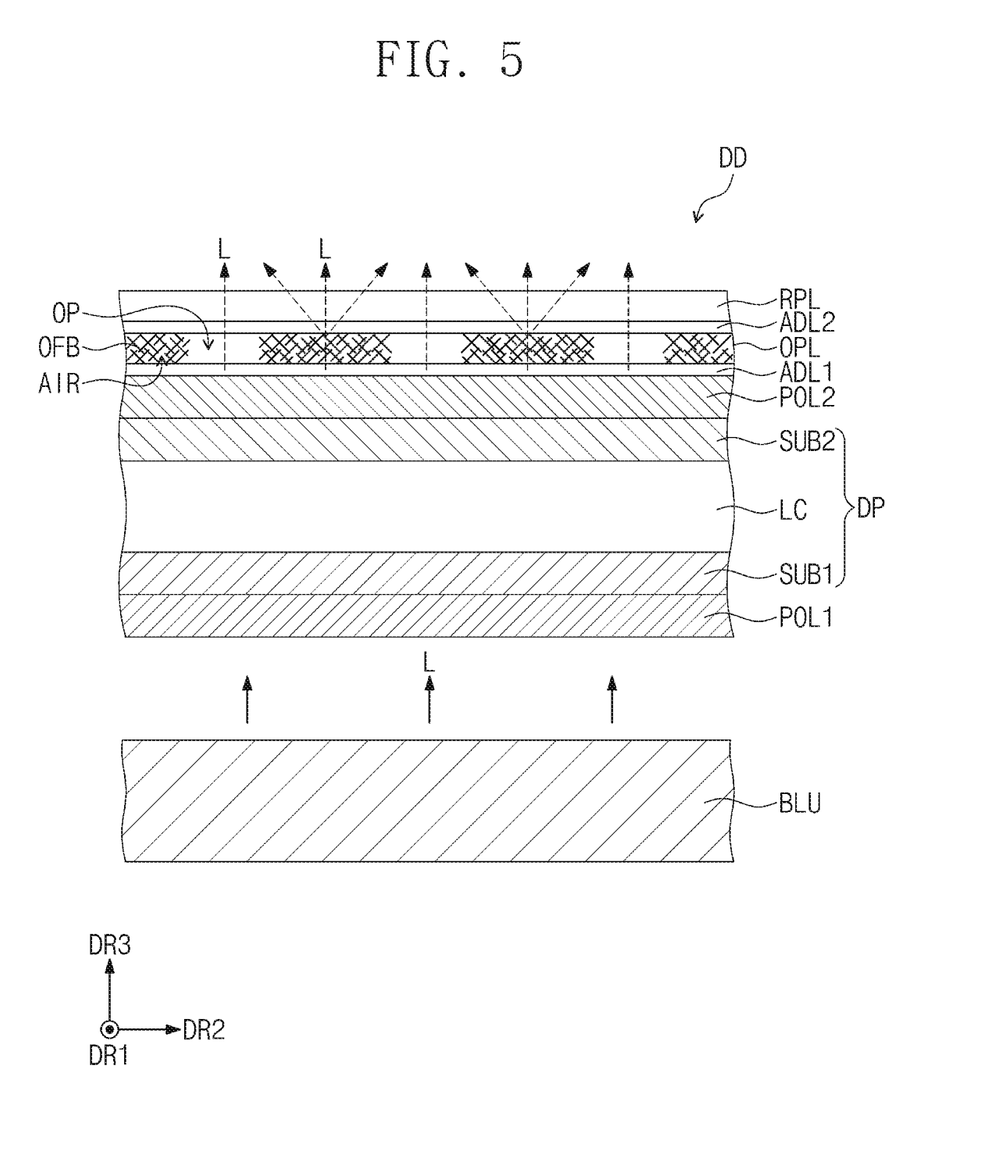
FIG. 5 illustrates a cross-sectional view showing a portion of the display device shown in FIG. 1.

FIG. 5 illustrates a cross-sectional view showing a portion of the display device depicted in FIG. 1.

FIG. 5 shows a cross-section corresponding to that of FIG. 4.

Referring to FIG. 5, the optical layer OPL may be attached to the second polarizing plate POL2 by a first adhesive ADL1 and to the antireflective layer RPL by a second adhesive ADL2. The first adhesive ADL1 may be disposed between the optical layer OPL and the second polarizing plate POL2, and the second adhesive ADL2 may be disposed between the optical layer OPL and the antireflective layer RPL.

The first and second adhesives ADL1 and ADL2 may include an optical clear adhesive (not shown). Alternatively, the first and second adhesives ADL1 and ADL2 may include various adhesives other than the optical clear adhesive. The first and second adhesives ADL1 and ADL2 may have low fluidity and high viscosity so that they will not enter between the optical fiber segments OFB.

As depicted on FIG. 5, the display panel DP may be provided with light L generated from the backlight unit BLU. The light L may pass through the first polarizing plate POL1, the display panel DP, and the second polarizing plate POL2, and may then be provided to the optical layer OPL.

The light L may be provided to the optical fiber segments OFB disposed on the second polarizing plate POL2, and may be diffused by the optical fiber segments OFB and the air layer AIR.

Because the optical fiber segments OFB have their refractive index different from that of the air layer AIR, the light L may be refracted at boundaries between the air layer AIR and the optical fiber segments OFB. The light L may be refracted by the optical fiber segments OFB irregularly disposed, which may result in diffusion of the light L. The diffused light L may pass through the antireflective layer RPL, and then may be emitted upwardly.

The light L emitted from the display panel DP may be polarized light, which may travel in a certain direction. For example, the light L from the display panel DP may be emitted in an upward direction perpendicular (e.g., at an angle of) 90° to a plane or may be emitted at an angle substantially close to 90°.

When no optical layer OPL is used, the light L from the display panel DP may be emitted in an upward direction substantially perpendicular to a plane, and then may be provided to a user. In this case, when the user faces the display panel DP in a direction different from a traveling direction of the light, an image may not be clearly recognized. For example, a viewing angle may become reduced to decrease side visibility.

In some embodiments of the present disclosure, the optical layer OPL disposed on the display panel DP may diffuse the light L provided from the display panel DP to increase an emission angle of the light L. Accordingly, the light L emitted from the display panel DP may propagate in various directions to increase the viewing angle and to improve side visibility.

That is, the display device DD according to some embodiments of the present disclosure may increase viewing angle and improve side visibility.

When the light L diffuses, an amount of light emitted in an upward direction substantially perpendicular to a plane may become reduced to decrease front brightness. The front brightness may be defined to refer to brightness measured when facing the display panel DP in a direction perpendicular to a plane of the display panel DP.

In contrast, in some embodiments of the present disclosure, a certain light L may pass through the openings OP defined on the optical layer OPL and may propagate in an upward direction substantially perpendicular to a plane. Accordingly, the openings OP may increase the front brightness.

FIGS. 6, 7, 8, 9, and 10 illustrate diagrams showing a method of fabricating a display device according to some example embodiments of the present disclosure.

Figure 6:
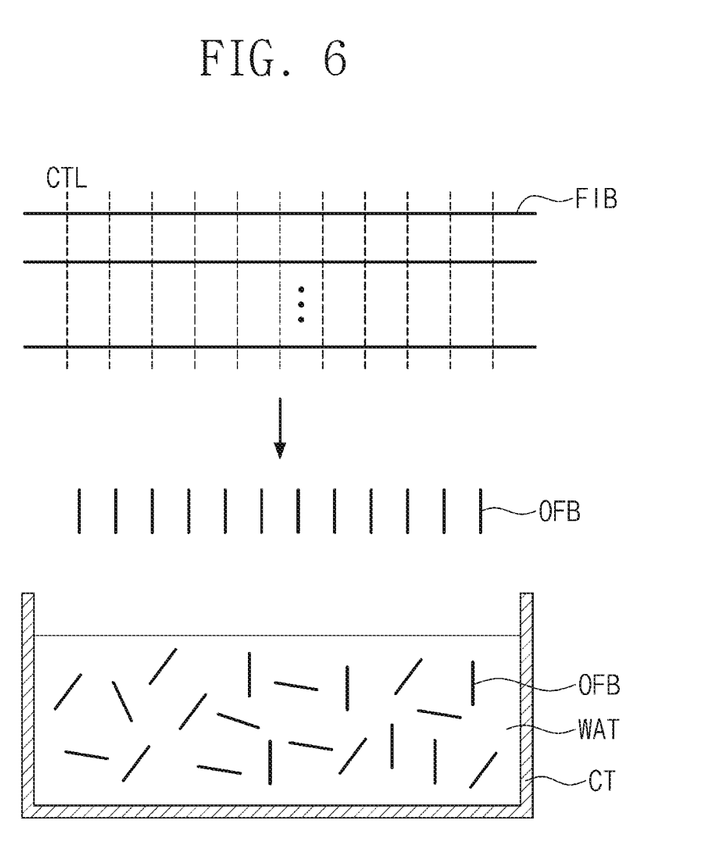
FIG. 6, FIG. 7, FIG. 8, FIG. 9 and FIG. 10 illustrate diagrams showing a method of fabricating a display device according to some example embodiments of the present disclosure.

Referring to FIG. 6, a container CT may be prepared in which a solution WAT is provided. A plurality of fibers FIB may be prepared which are formed of plastic. For example, the fibers FIB may include polyethylene terephthalate (PET), polycarbonate (PC), polystyrene (PS), or poly methyl methacrylate (PMMA).

The fibers FIB may be cut along cutting lines CTL to form a plurality of optical fiber segments OFB. The solution WAT may include the optical fiber segments OFB.

Figure 7:
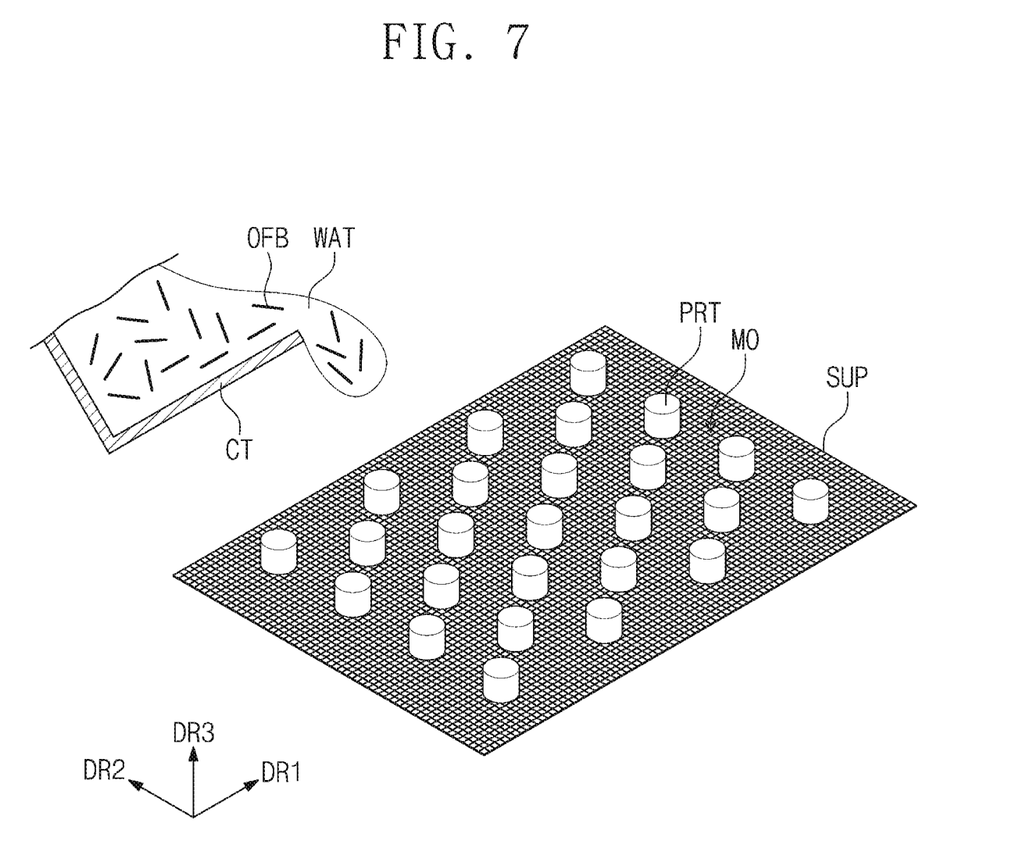

Referring to FIG. 7, a mesh-shaped support plate SUP may be prepared. The support plate SUP may have openings MO that are defined based on the mesh shape of the support plate SUP. Each of the optical fiber segments OFB may have a length greater than a width of each of the openings MO.

A plurality of protrusions PRT may be disposed on an upper portion of the support plate SUP. The protrusions PRT may each have a cylindrical shape that extends in a third direction DR3, but the shapes of the protrusions PRT are not limited. The protrusions PRT may be disposed to correspond to the openings OP of the optical layer OPL discussed above.

The support plate SUP may be provided with the solution WAT having the optical fiber segments OFB.

Figure 8:
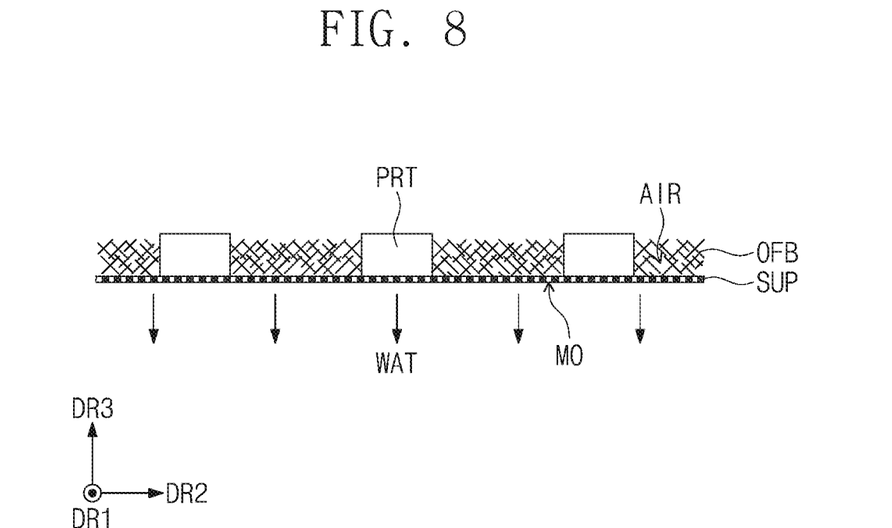

Referring to FIG. 8, the solution WAT may fall downwardly from the support plate SUP through the openings MO of the support plate SUP. FIG. 8 shows a cross-section of a portion of the support plate SUP and cross-sections of three protrusions PRT disposed on the support plate SUP.

The solution WAT may be removed, and the optical fiber segments OFB may be disposed on the support plate SUP. Because the length of the optical fiber segments OFB is greater than the width of the openings MO, the optical fiber segments OFB may be stacked on the support plate SUP without falling downwardly from the support plate SUP through the openings MO.

The optical fiber segments OFB may be absent on places where the protrusions PRT are disposed. The optical fiber segments OFB may be disposed around each of the protrusions PRT. The support plate SUP may be provided with the optical fiber segments OFB that are stacked to a height of the protrusions PRT. The optical fiber segments OFB provided on the support plate SUP may be in contact with each other, but may not be connected to each other.

The optical fiber segments OFB may be in partial contact with each other. Alternatively, some of the optical fiber segments OFB may not contact each other. For example, as discussed above, a resin may be disposed inside of the air layer AIR of the optical fiber segments OFB, and the optical fiber segments OFB in which the resins are disposed may be spaced apart from each other without being in contact with each other. Although not shown, a fluid resin may be provided to the optical fiber segments OFB, and may thus be disposed inside of the air layer AIR of the optical fiber segments OFB.

Figure 9:
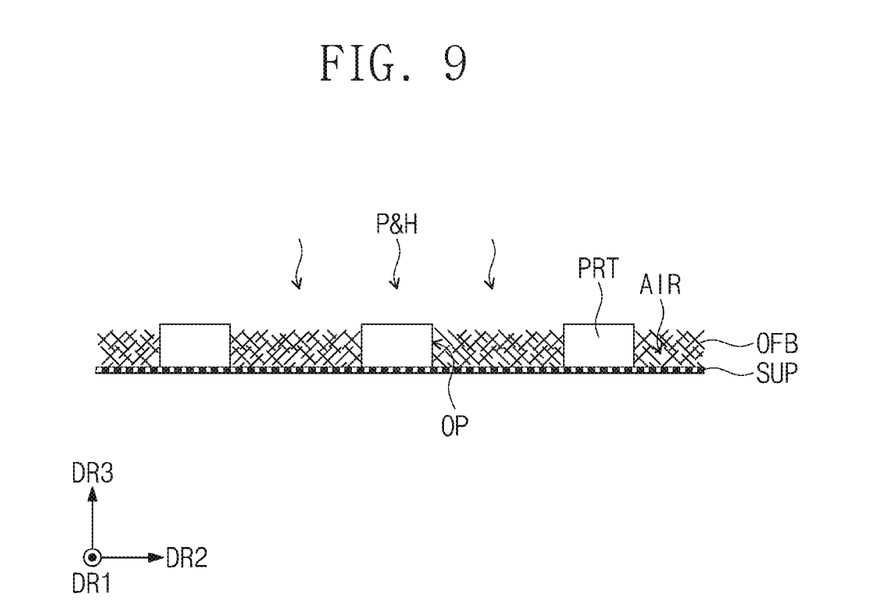

Referring to FIG. 9, the optical fiber segments OFB may be supplied with pressure and heat P&H. The optical fiber segments OFB may be connected to each other by the pressure and heat P&H. The pressure and heat P&H may allow connecting contact portions between the optical fiber segments OFB by melting the contact portions. The optical fiber segments OFB may be connected to each other to fabricate the optical layer OPL discussed above. The optical layer OPL may be separated from the support plate SUP.

Because the optical fiber segments OFB are not disposed where the protrusions PRT are disposed, when the optical layer OPL is separated from the support plate SUP, the openings OP may be defined at portions of the optical layer OPL, which correspond to the protrusions PRT.

Figure 10:
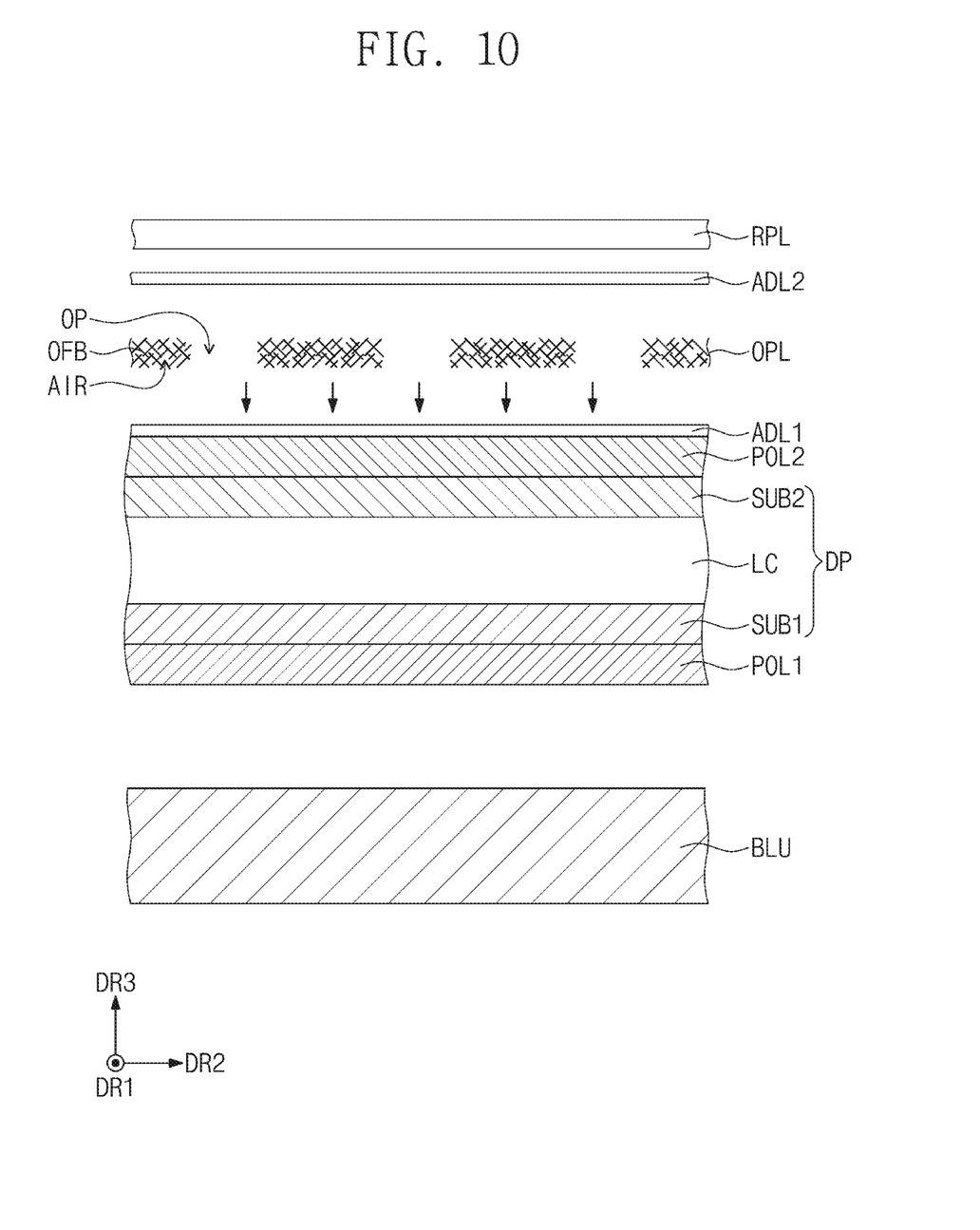

Referring to FIG. 10, the optical layer OPL formed of the optical fiber segments OFB may be disposed on a display panel DP. FIG. 10 shows a cross-section corresponding to that of FIG. 5. The first adhesive ADL1 may be disposed between the optical layer OPL and the display panel DP, and thus the optical layer OPL may be attached to the display panel DP.

For example, a second polarizing plate POL2 may be disposed on the display panel DP, and the first adhesive ADL1 may be disposed on the second polarizing plate POL2. The optical fiber segments OFB may be attached to the second polarizing plate POL2 by the first adhesive ADL1.

A backlight unit BLU may be disposed below the display panel DP. An antireflective layer RPL may be disposed on the optical layer OPL, and may be attached to the optical layer OPL by a second adhesive ADL2, with the result that the display device DD shown in FIG. 1 may be fabricated.

Through the fabrication method mentioned above, the optical layer OPL may be fabricated on which the openings OP are defined, and light may be diffused by the optical fiber segments OFB of the optical layer OPL.

A display device according to some embodiments of the present disclosure may include an optical layer that is disposed on a display panel and that diffuses and emits light provided from the display panel. Because the optical layer increases an emission angle of the light, the display device may increase viewing angle and improve side visibility.

Although the present disclosure are described in conjunction with some example embodiments thereof, it would be understood by those skilled in the art that the present disclosure can be modified or changed in various ways without departing from spirit and scope of the present disclosure defined by the appended claims. Further, the embodiments disclosed herein are not intended to limit the technical spirit of the present disclosure, and all technical spirit within the claims and their equivalents should be construed as being included in the present disclosure.

What is claimed is:

1. A display device, comprising:
   a display panel;
   an optical layer disposed on the display panel; and
   a backlight unit that is disposed below the display panel and provides the display panel with light,
   wherein the optical layer comprises:
      a plurality of optical fiber segments; and
      an air layer dispersed among the optical fiber segments, and
   wherein a plurality of openings is formed in the optical layer to allow the light to pass through.

2. The display device of claim 1, further comprising a resin that is disposed inside of the air layer,
   wherein the resin has a refractive index less than a refractive index of the optical fiber segment.

3. The display device of claim 2, wherein
   the optical fiber segments are in partial contact with each other, and
   one or more of the optical fiber segments are spaced apart from other optical fiber segments.

4. The display device of claim 1, wherein the optical fiber segments include polyethylene terephthalate, polycarbonate, polystyrene, or poly methyl methacrylate.

5. The display device of claim 1, wherein the optical layer has a thickness of about 20 μm to about 150 μm.

6. The display device of claim 1, wherein the light is passed through the display and provided to the optical layer.

7. The display device of claim 6, wherein
   the display panel has a plane defined by a first direction and a second direction that intersects the first direction, and
   the openings are arranged in a first diagonal direction and a second diagonal direction that intersects the first diagonal direction, the first diagonal direction intersecting the first and second directions on the plane.

8. The display device of claim 1, further comprising:
   a first polarizing plate disposed between the display panel and the backlight unit; and
   a second polarizing plate disposed between the display panel and the optical layer.

9. The display device of claim 8, further comprising an antireflective layer disposed on the optical layer.

10. The display device of claim 9, further comprising a first adhesive disposed between the optical layer and the second polarizing plate and a second adhesive disposed between the optical layer and the antireflective layer.

11. A display device, comprising:
    a display panel;
    a polarizing plate disposed on the display panel;
    a plurality of optical fiber segments disposed on the polarizing plate; and
    a backlight unit disposed below the display panel,
    wherein light generated from the backlight unit is provided to the optical fiber segments through the display panel and the polarizing plate, and the light is diffused by the optical fiber segments and an air layer between the optical fiber segments.

* * * * *